United States Patent [19]
Robinson

[11] Patent Number: 5,730,484
[45] Date of Patent: Mar. 24, 1998

[54] ADJUSTABLE AUTOMOBILE SHADE

[76] Inventor: James Carl Robinson, 11059 Louise Ave., Granada Hills, Calif. 91344

[21] Appl. No.: 705,701

[22] Filed: Aug. 30, 1996

[51] Int. Cl.[6] ............................................. B60J 3/02
[52] U.S. Cl. ...................... 296/976; 296/97.8; 296/97.1
[58] Field of Search ............................ 296/97.1, 97.6, 296/97.8, 138; 160/330

[56] References Cited

U.S. PATENT DOCUMENTS

| | | | |
|---|---|---|---|
| 2,201,197 | 5/1940 | Minor, Jr. | 296/978 |
| 2,432,674 | 12/1947 | Office | 296/97 |
| 2,458,125 | 1/1949 | Winkler | 296/97 |
| 3,352,375 | 11/1967 | Wheeler | 296/97 |
| 3,617,088 | 11/1971 | Graham | 296/97 C |
| 3,809,428 | 5/1974 | Cohen | 296/97 C |
| 4,023,855 | 5/1977 | Janata et al. | 296/97 C |
| 4,919,469 | 4/1990 | Aizawa et al. | 296/97.6 |
| 4,982,992 | 1/1991 | Vu et al. | 296/97.6 |
| 5,098,149 | 3/1992 | Lee | 296/97.6 |
| 5,165,748 | 11/1992 | O'Connor | 296/97.6 |
| 5,402,924 | 4/1995 | Gilson | 224/312 |

FOREIGN PATENT DOCUMENTS 2617700   1/1989   France ...................... 160/330

*Primary Examiner*—Dennis H. Pedder
*Attorney, Agent, or Firm*—Gene Scott; Patent Law & Venture Group

[57] ABSTRACT

An add-on shading device provides additional protection both laterally and downwardly with respect to the standard automobile visor. It includes a screen that is partially transparent so that one may be partially shaded while still having adequate vision during driving. A glove engages over the visor and is able to be shifted left or right so as to adapt for lateral shading requirements. A downwardly extending screen attaches to the glove adjustably, so that it may be positioned at a desired height. A side extending tab is positioned to provide improved holding and positioning capability of the screen on the glove.

6 Claims, 2 Drawing Sheets

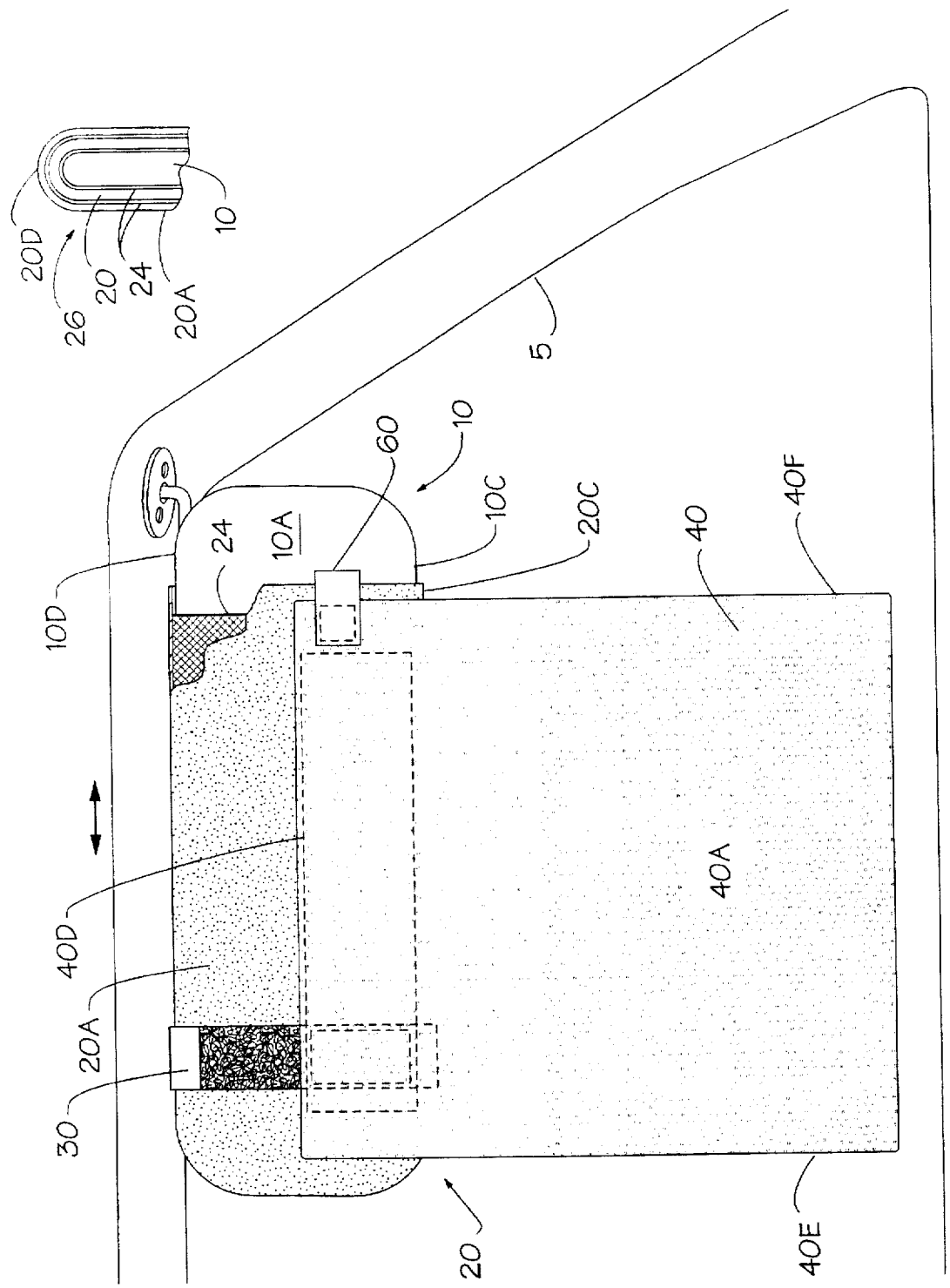

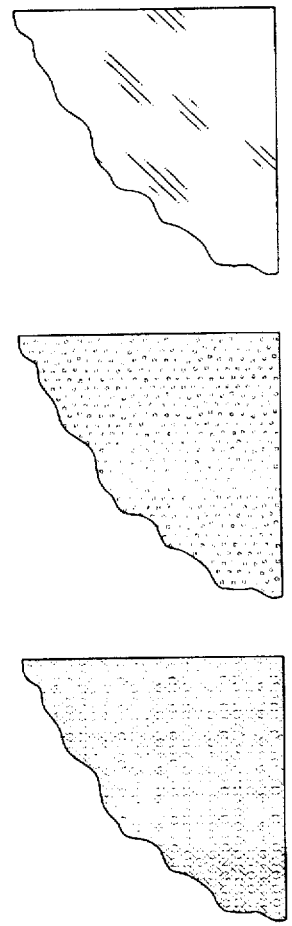
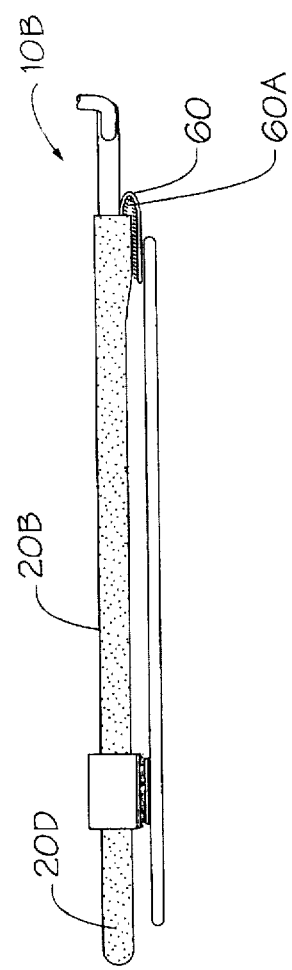

ADJUSTABLE AUTOMOBILE SHADE

BACKGROUND OF THE INVENTION

1. Field of the Invention

This invention relates generally to window shades for automobiles, and more particularly to an adjustable shade for mounting onto a standard automobile visor.

2. Description of Related Art

The following art defines the present state of this field:

Gilson, U.S. Pat. No. 5,402,924 describes a visor attachment which can be easily affixed to and removed from the visor of an automobile, truck or aircraft. The device includes a "U" shaped frame constructed from a moldable plastic, a stretchable mesh panel spanning the frame and adapted to encircle the visor in a manner to hold the attachment securely in place. The mesh panel is provided with a multiplicity of contiguous openings so that articles contained within the pouch can be easily seen.

Aizawa, U. S. Pat. No. 4,919,469 describes an improved auxiliary sun visor. It comprises a base plate removably attached to a sun visor installed against a windshield of an automobile and having a guide hole therein with a movable member slidably mounting in the guide hole. The movable member can be fixed at a suitable position along said elongated guide hole and a colored transparent light shielding plate can be attached to the movable member. The colored transparent light shielding plate van change its angle in horizontal or vertical plane freely in accordance with the need of the driver. Further using a strap piece, the attachment of the auxiliary sun visor is facilitated.

Graham, U.S. Pat. No. 3,617,088 describes an extender for motor vehicles sunvisors which in one form of the invention has a form of a sleeve which encompasses the sunvisor and can be moved downwardly and sideways thereon to cover additional areas not normally covered by the sunvisor. In another form of the invention a metal clip attached to the sunvisor supports the extender which is positioned on one side of the sunvisor. Still another form of the invention has a metal clip secured to the extender with metal clip engaging the opposite side of the sunvisor from the extender.

Lee, U.S. Pat. No. 5,098, 149 describes an invention for the purpose of shielding the interior of a parked vehicle from sunlight, this invention discloses a retractable windshield shade assembly mounted at the front edge of an existing sun visor. A reflective coating on the exterior surface of said shade reflects part of the radiant energy. It may be swung to the side to serve as a front side window shade.

Cohen, U.S. Pat. No. 3,809,428 describes a stretchable, tubular sleeve-like member provided with means thereon for the reception of various often used articles or objects and which is adapted to be mounted on the sun visor of a motor vehicle to thereby render such articles 18 or objects easily accessible to the driver or passenger of a motor vehicle.

Vu et al., U.S. Pat. No. 4,982,992 describes a glare shield which can easily be clipped on the conventional sun visor used in a motor vehicle wherein the glare shield is mounted on a bracket in a manner which provides up and down pivotal movement, lateral sliding and rotation transversely relative the sun visor.

Janata et al., U.S. Pat. No. 4,023,855 describes a glare shield assembly for use in combination with an auto sun visor, wherein a light filtering shield has means for attaching it to the sun visor to allow the shield to be moved up and down, sideways and pivotable, about a vertical as well as about an horizontal axis, with respect to the sun visor.

O'Conner, U.S. Pat. No. 5,165,748 describes an extended sun visor accessory for motor vehicle including central and side panels that are foldable into an inoperative position wherein the accessory may be stored in a space similar to that of a conventional vehicle sun visor employed for aircraft, shipcraft and various motor vehicles when inoperative and extended to cover a windshield for the vehicle. The extended sun visor panels are foldable along both vertical and horizontal fold lines, extending from the conventional vehicle sun visor first along horizontal folds that are parallel to the longitudinal axis of the vehicle sun visor and then extending along vertical fold lines that are perpendicular to the longitudinal axis of the vehicle sun visor to cover virtually the entire windshield thereof. Securing means retains the accessory when inoperative. The accessory may be constructed to attach to a vehicle sun visor or the vehicle sun visor may be constructed to house the invention within a recessed area contained within the vehicle sun visor.

Office, U.S. Pat. No. 2,432,674 describes a sleeve adapted to fit over an automobile visor and to slide laterally on it for an improved range of shading. One of the principal objectives of this invention is to provide an easily applied, easily adjusted rightwardly and leftwardly glare shield attachment which is reversible and adapted to be slipped over either the right or left hand glare shield mounted on the automotive vehicle.

Winkler, U.S. Pat. No. 2,458,125 describes a dual tint glare shield and a mounting therefor. This invention provides a glare shield whose mounting is especially designed and constructed for ready attachment to the conventional opaque visor and capable of foldability in relation thereto when not in use. It further provides a glare shield having a field divided horizontally into two colors or tints, one suitable for daytime driving while the other shields the eyes against the glare of headlights of approaching vehicles.

Wheeler, U.S. Pat. No. 3,351,375 describes a glare shield mounted by spring clip or clips on an edge of a visor for suspending a shield from the extended edge of the visor. This invention provides a glare shield for use in motor vehicles in which bright trays of light, such as rays from the sun or of approaching vehicles area absorbed by a sheet of woven material or fabric.

The prior art teaches, in Office, U.S. Pat. No. 2,432,674 a sleeve adapted to fit over an automobile visor and to slide laterally on it for an improved range of shading. It also teaches, in O'Connor, U.S. Pat. No. 5,165,748, a downward extension for a visor. Janata et al, U.S. Pat. No. 4,023,855 teaches hook and loop type attachments in visor extensions, and Wheeler U.S. Pat. No. 3,351,375 teaches clip attachment. However, the prior art does not teach the advantage of a combined laterally and downwardly extending device nor of how to achieve both in a single inexpensive manner. The present invention fulfills these needs and provides further related advantages as described in the following summary.

SUMMARY OF THE INVENTION

The present invention teaches certain benefits in construction and use which give rise to the objectives described below.

The standard automotive visor is able to be rotated downwardly so as to prevent direct sunlight exposure into the eyes of driver and passenger by placing an opaque object between the vehicle window and the eyes. There is a problem in that such visors tend to obscure the driver's vision, and although such visors are also able to rotate to one side, i.e., block light rays entering from the side window, they generally are not large enough to provide convenience to individuals of every size from light rays entering from every angle through either the front window or the side window. The present invention provides an add-on shading device that is able to provide additional protection both laterally and downwardly with respect to the standard auto visor. Additionally, it may include a screen that is partially transparent so that one may be partially shaded while still having adequate vision during driving.

A primary objective of the present invention is to provide an extending shade for the automobile providing lateral as well as downward shading relative to the standard auto visor. Another objective is to provide such a capability in a relatively inexpensive device. A further objective is to provide such a shading device that is easily adjusted to meet the needs of small as well as larger persons and to block direct light rays entering the automobile from all angles. An important objective of the present invention is to provide a sun shade device that is easy to use yet constructed and designed for long life with an efficient manufacturing cost. Another important objective of the present invention is to provide such a shading device having a cushioning means to provide added protection in the case of an accident where a passenger might strike the device.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 1 is a front elevational view of the preferred embodiment of the present invention showing one manner in which the invention is mounted to an automobile visor on the driver's side of the automobile, and wherein the visor has been rotated to cover the driver's side window;

FIG. 1A is a partial side elevational view thereof showing the manner of construction and fit of a glove of the invention over an automobile visor;

FIG. 2 is a side elevational view of the present invention;

FIG. 3 is a top plan view thereof; and

FIGS. 4, 5 and 6 are front elevational views of certain sheet materials of importance in the present invention.

DETAILED DESCRIPTION OF THE PREFERRED EMBODIMENT

The above described drawing figures illustrate the invention, a shading device for use on, and in conjunction with, a standard automobile visor 10. Typically, the standard visor 10 has a front visor surface 10A, a rear visor surface 10B, a bottom, generally horizontal edge 10C, and a top, generally horizontal edge 10D. The present invention provides a self supporting glove 20 having a front glove wall 20A preferably in contact with the front visor surface 10A, and a rear glove wall 20B preferably in contact with the rear visor surface 10B. The walls 20A and 20B are joined along a generally horizontal top glove edge 20D preferably in contact with the top horizontal edge 10D of the visor 10 for supporting the glove 20 on the visor 10, and along a generally horizontal bottom glove edge 20C preferably in contact with the bottom horizontal edge 10C of the visor 10 for closing the glove 20 around the visor 10 for further supporting the glove 20 on the visor 10. The glove 20, as shown in FIG. 1A, preferably includes an outer cloth covering 26 over a soft cushion material 22 such as foam rubber. The cushion material 22 preferably is lined on both sides with a scrim layer 24 such as a nylon net having a low coefficient of friction. The glove 20 is therefore able to be easily moved laterally on the visor 10 for positioning the device as necessary for shading. Also, the scrim layer 24 is enables the outer cover 26 to be easily removed from the cushion material 22. The construction of the glove is such as to provide rigidity as a self supporting structure so that the glove may be positioned with part of the glove not supported internally directly by the visor 10 and so that the glove will not tend to fold or otherwise loose its preferred shape as shown in FIG. 1. In this respect, an adequately stiff cushion material 22 is employed.

A vertically oriented shading sheet 40 of a generally flexible material, preferably cloth, provides a front 40A and a rear 40B sheet surfaces defining a horizontally oriented top sheet edge 40D and a left side 40 E and a right side 40F edges. The sheet 40 is preferably rectangular and of such size as to provide effective blocking of light rays entering the automobile 5. The sheet 40 is advantageously made of an open weave fabric as shown in FIG. 4, or of an opaque material providing a pattern of holes, as shown in FIG. 5, so as to allow an only partially obscured view therethrough while preventing most of the light directed onto it from passing through. Alternately, the shading sheet 40 may be formed of a semi-transparent material as shown in FIG. 6, such as a metallized plastic sheet as is used to darken automotive glazing. In each case, the sheet 40 allows at least a partial view through the sheet 40, while blocking light. The strip includes a weighted hem 40G forming a bottom edge. A weight 40H is removably inserted in the hem 40G in order to prevent the sheet 40 from moving when air currents are present within the vehicle 5.

The shading sheet 40 is preferably mounted to the glove 20 by two attachment devices. The first is a strap 30 formed into a loop of a size for tightly fitting around the glove 20, as best seen in FIGS. 1 and 2. The sheet 40 may be positioned upwardly and downwardly in accordance with shading needs by merely rotating the strap 30 around the glove 20.

The shading sheet 40 preferably includes a flexible side tab 60 integral with the side edge 40F of the shading sheet 40 and extending laterally with respect to the shading sheet 40. This is best seen in FIGS. 1 and 3. The tab 60 is preferably folded around the front wall 20A of the glove 20. The side tab 60 further preferably provides a hook fastener material surface 60A for interconnection with the rear surface of front wall 20A of the glove 20. For this attachment purpose the rear side of the front wall 20A includes a loop type fastener surface for connecting with tab 60. The side tab 60 provides needed stability and connectivity for removably joining shading sheet 40 to glove 20.

The selection of materials and their placement is critical in this invention. Each selected material is of a particular type to achieve the engineering objectives involved.

Alternative materials and placements have been considered, but not used since the specific combination of elements in the present disclosure provide needed advantages and economics for achieving the objectives of the invention, while alternative enablements fall far short of goal. For instance, the exterior 22 of the glove 20 is preferably a fabric surface made of, for instance, a woven cloth, and is removable so as to be able to be easily cleaned when soiled during handling. This is critical in order to maintain the proper appearance of the invention. The foam rubber interior of the glove provides additional protection and safety in case a person's head might strike the visor during an accident. These foregoing selections of material placement provides critical enablement in the invention providing long life, clean surfaces, and ease of use.

In use, the glove 20 may be moved and positioned laterally on the visor 10 of an automobile 5. Additionally, the shading sheet may be placed at appropriate positions on the visor 10 or the glove 20. Further, the shading sheet 40 may be placed at will onto the glove 20 and positioned both laterally and vertically in order to meet a broad range of shading requirements. The sheet 40 may be easily wrapped around the glove 20 (position not shown) for storage of the sheet 40 and for improved visibility and for entering or disembarking from the vehicle when the visor is positioned adjacent to the side window. The invention may be used with either the driver's side visor, or with the passenger's side visor and is preferably used for blocking direct sunlight from entering through the side windows of a vehicle.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A shading device for use with an automobile visor, the visor having a front visor surface, a rear visor surface, a bottom, generally horizontal edge, and a top, generally horizontal edge, the device comprising:

a self supporting glove providing a front glove wall in contact with the front visor surface, and a rear glove wall in contact with the rear visor surface, the walls joined along a generally horizontal top glove edge in contact with the top horizontal edge of the visor for supporting the glove on the visor, and along a generally horizontal bottom glove edge in contact with the bottom horizontal edge of the visor for closing the glove around the visor for further supporting the glove on the visor, the glove comprising a cushioning material covered by an outer removable cover, the cushioning material covered by a low friction layer in contact with the removable cover and with the visor;

a vertically oriented shading sheet of a generally flexible material, the sheet providing a front and a rear sheet surfaces defining a horizontally oriented top sheet edge, the sheet further including a left side and a right side edges, and integral with the sheet and positioned toward the left side thereof, a loop of flexible material sized for tightly fitting around the glove, and the sheet further including a side tab extending laterally from the right side thereof and folded around the front wall of the glove for removable interconnection therewith.

2. The device of claim 1 wherein the side tab provides a hook fastener material surface for interconnection with the removable cover of the glove.

3. The device of claim 1 wherein the shading sheet is made of an open weave fabric so as to allow an only partially obscured view therethrough.

4. The device of claim 1 wherein the shading sheet is made of an opaque material providing a pattern of holes so as to allow an only partially obscured view therethrough.

5. The device of claim 1 wherein the shading sheet is made of a semi-transparent material so as to allow an only partially obscured view therethrough.

6. The device of claim 1 wherein the shading sheet includes a weighted hem for holding the sheet in position.

* * * * *